United States Patent [19]

Moore et al.

[11] Patent Number: 4,756,658

[45] Date of Patent: Jul. 12, 1988

[54] DISABLED CAR CARRIER VEHICLE

[75] Inventors: Vernon S. Moore, Ringgold, Ga.; Kenneth A. Law, Chattanooga, Tenn.

[73] Assignee: Holmes International Inc., Chattanooga, Tenn.

[21] Appl. No.: 33,754

[22] Filed: Apr. 3, 1987

[51] Int. Cl.$^4$ ................................................ B60P 1/16
[52] U.S. Cl. .................................... 414/477; 298/14; 298/22 C
[58] Field of Search .................... 414/477–480, 414/469, 491, 494; 298/11–14, 22 C

[56] References Cited

U.S. PATENT DOCUMENTS

| | | | |
|---|---|---|---|
| 2,466,452 | 2/1949 | Lisota | 414/477 |
| 3,083,349 | 4/1963 | Mottin | 298/12 |
| 3,454,175 | 7/1969 | Kellaway | 414/478 |
| 3,485,400 | 12/1969 | Pewthers | 414/477 |
| 3,812,988 | 5/1974 | Pyle | 414/477 |
| 4,139,236 | 2/1979 | Hill et al. | 414/477 X |
| 4,225,280 | 9/1980 | Brunet et al. | 414/479 |
| 4,236,756 | 12/1980 | Hildebrand et al. | 298/11 |
| 4,508,388 | 4/1985 | Minami | 298/22 C |

*Primary Examiner*—Robert J. Spar
*Assistant Examiner*—David A. Bucci
*Attorney, Agent, or Firm*—Alan Ruderman

[57] ABSTRACT

A carrier vehicle for carrying at least one car or the like on a platform slidable and tiltable relative to a fixed bed includes hold-down devices for locking the platform against tilting when the platform is in a rest position in the forward end of the bed. Hydraulic cylinders selectively slide the platform and tilt the platform by separate control rods which are manually actuated. The vehicle includes a safety device for preventing tilting of the platform when the platform is locked by the hold-down devices so as not to break the hold-down devices and for preventing the platform from tilting downwardly onto the hold-down devices when the platform has been slid forwardly but not tilted completely for locking by the hold-down devices. The safety device includes a cam plate fixed to the control rod which effects tilting and a stop plate fastened to a rail forming a portion of the platform. The stop plate and the cam plate are located so that they engage when the platform is locked by the hold-down devices and when the platform is positioned at the forward end of the bed but not completely tilted for locking engagement with the hold-down devices. When the stop plate and the cam plate engage, the tilt function is disabled.

18 Claims, 2 Drawing Sheets

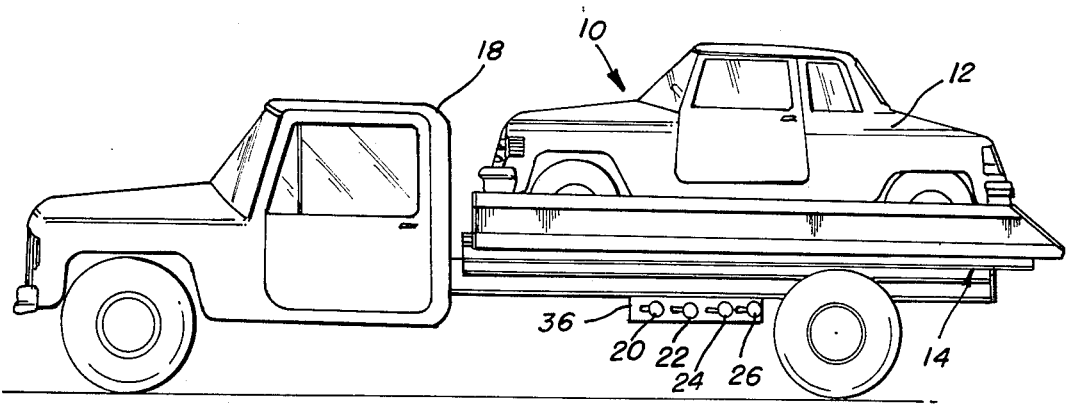
FIG. 1
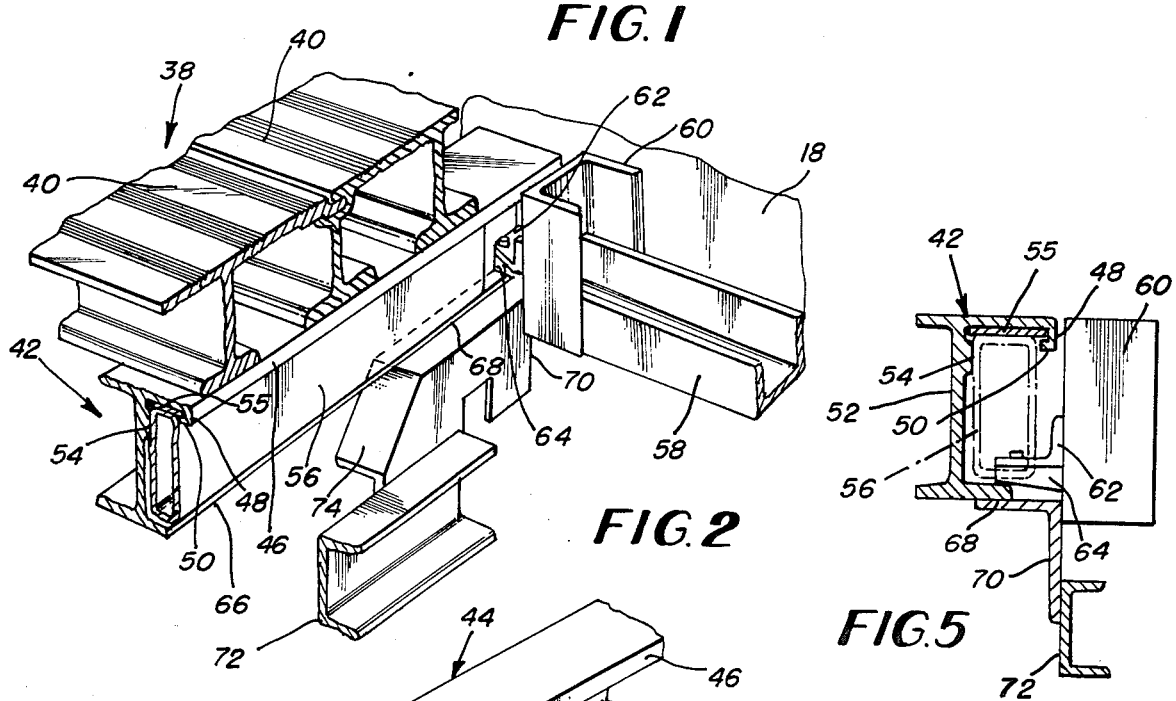
FIG. 2
FIG. 5
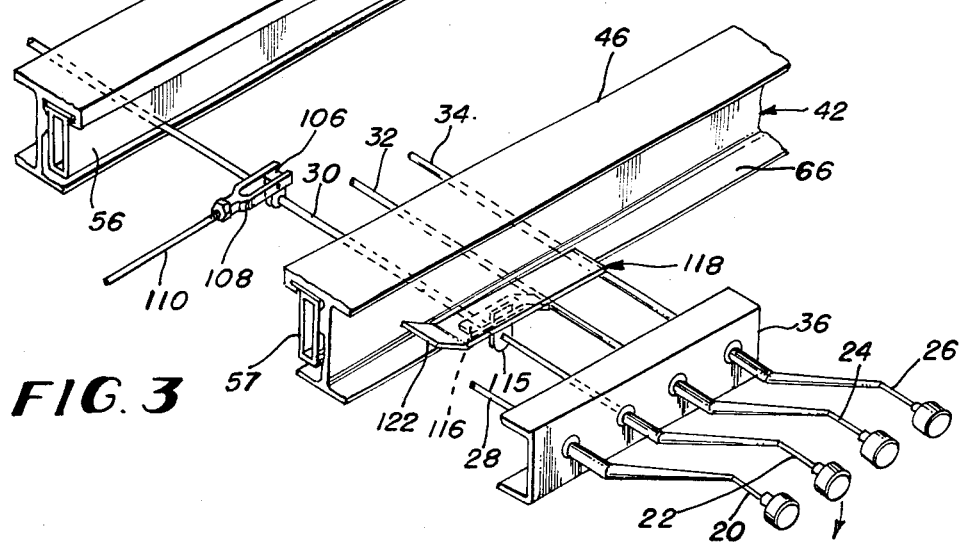
FIG. 3

U.S. Patent  Jul. 12, 1988  Sheet 2 of 2  4,756,658
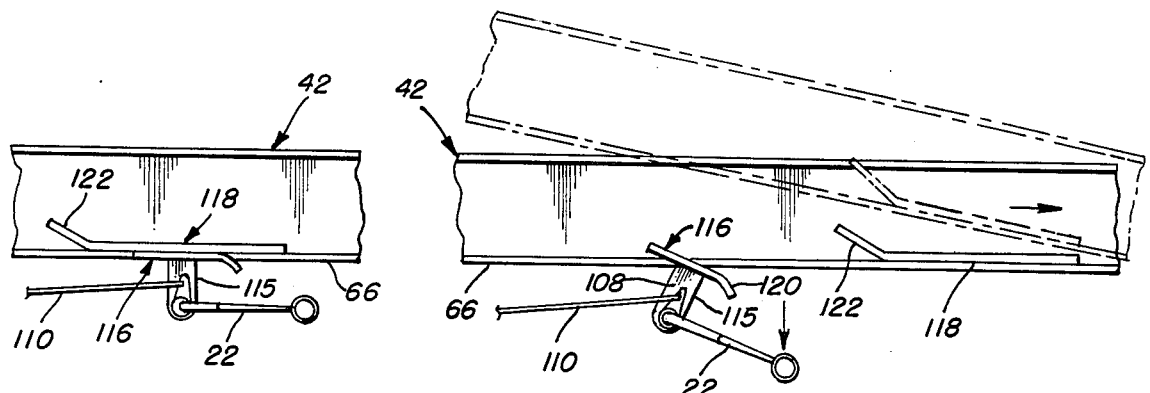
FIG. 6
FIG. 7
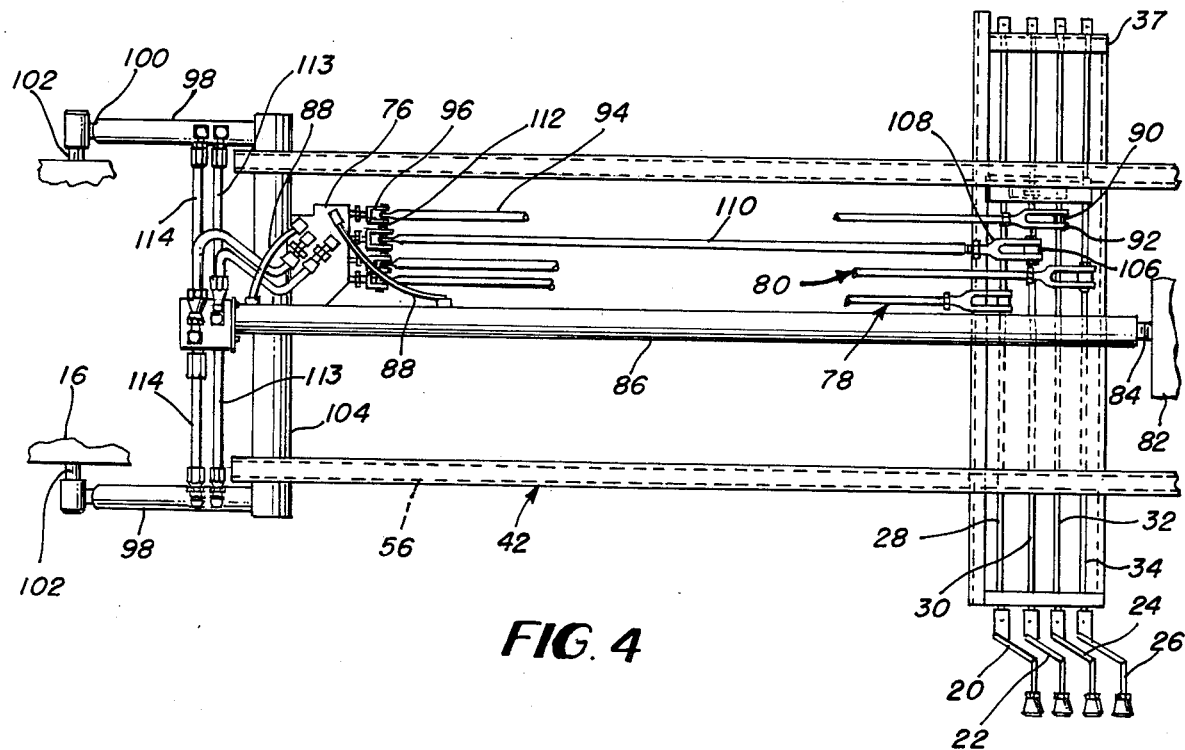
FIG. 4

DISABLED CAR CARRIER VEHICLE

BACKGROUND OF THE INVENTION

This invention relates to slidable and tiltable platform vehicle carriers of the type wherein the platform slides and tilts to provide a ramp for loading a vehicle thereon for transporting over the road, and more particularly to a disabling system for preventing the tilting of the platform until the platform has been slidably positioned to avoid interference with and damages to the carrier hold-down locking system.

In the art of recovering disabled vehicles use may be made of a truck or carrier vehicle having a slidable and tiltable deck or platform on which at least one vehicle may be loaded and carried.

Such vehicle carriers generally include a means for locking down the moveable bed or carrier deck platform when in the forward position to ensure that the structure does not freely or inadvertently tilt which would create a major safety problem when a vehicle is being transported. The locking occurs after the deck has been tilted to the horizontal position as the bed and deck are slidably moved forwardly to just slightly behind its forwardmost position and unlocked by sliding the bed and deck rearwardly to clear the locking position before it is tilted. In the known constructions a hold-down device in the form of a fixed latch block is disposed at the forward end of the bed and a cooperating member on the slidable portion of the bed is received beneath the block. Such an arrangement is illustrated in U.S. Pat. No. 3,450,282. Because of the heavy loads supported by the deck, the sliding and tilting are effectuated by hydraulic means such as hydraulic cylinders controlled by hydraulic valving. Occasionally, especially under circumstances where the operator is working under stressful conditions, or in inclement weather operators have inadvertently actuated the hydraulic tilt system to tilt the deck platform while the deck is in the forward position before it slidably has been driven rearwardly and also have tilted the deck platform downwardly at the forward position prior to it being slidably located beneath the locking device. In either case because of the forces involved the hold-down block may be severely damaged.

SUMMARY OF THE INVENTION

Consequently, it is a primary object of the present invention to provide in a tiltable and slidable deck carrier vehicle having a deck hold-down device for locking the deck down onto the bed of the vehicle, means for disabling the tilt function to preclude tilting when the deck is not slidably positioned properly.

It is another object of the present invention to provide in a slidable and tiltable deck vehicle carrier a lock-out system preventing the tilting of the deck when the deck is adjacent the forward extent of its travel.

It is a further object of the present invention to provide in a tiltable and slidable deck car carrier having a cam locking device at the forward end of the bed for holding the deck down against inadvertent tilting, a safety system for disabling the tilt function when the deck is adjacent the forward extent of its travel so that in the locked-down position the deck must first be slidably moved rearwardly out of the locking device.

It is a still further object of the present invention to provide in a tiltable and slidable deck car carrier having a hold-down device at the forward end of the bed for locking the deck down against inadvertent tilting, a safety system for disabling the tilt function while the deck is adjacent the forward extent of its travel so that in the locked position the deck must first be slidably moved rearwardly out of the hold-down device before it can be tilted, and additionally prevents tilting of the deck when returning toward the inactive position when the deck is so far forward as to slam onto the hold-down device.

Accordingly, the present invention provides a vehicle carrier having a tiltable and slidable deck platform for receiving and transporting disabled cars or the like, the deck platform having a hold-down device for locking the deck against tilting when the deck is disposed in the forward position thereby to preclude tilting of the deck inadvertently when a car is supported thereon, the hold-down function being activated by a plate portion of the deck platform as it is slidably positioned beneath a locking block fixed at the forward end of the bed of the vehicle, and safety means for precluding tilting of the deck platform when the deck is locked in the hold-down position. Additionally, the safety means precludes the deck from tilting downwardly onto the locking block when the deck has been slid forwardly, but not tilted completely to the downward position. In both instances the safety means prevents damage to the hold-down device which has resulted in the prior art constructions.

In the specific form of the invention the safety means comprises a stop plate or the like fixed to and slidable with a rail on which the deck platform is secured and a cam fastened to a linkage control rod. The control rod is normally turned by a lever to move linkage that actuates a tilt control hydraulic valve which controls hydraulic tilt cylinders. The stop plate is disposed such that when engaged by the cam, the cam and thus the control rod is precluded from turning. When the control rod is locked against turning, the valve shuts communication of hydraulic fluid to the tilt cylinders and the deck cannot be tilted.

By means of the present invention damage to a major safety element is precluded in a simple but effective manner. In the prior art when the hold-down device is damaged the carrier vehicle is either put out of commission until repair occurs or the vehicle is operated without the safety feature which may be extremely hazardous.

BRIEF DESCRIPTION OF THE DRAWINGS

The particular features and advantages of the invention as well as other objects will become apparent from the following description taken in connection with the accompanying drawings, in which:

FIG. 1 is a side elevational view of a car carrier vehicle of the type having a tiltable and slidable deck platform incorporating the principles of the present invention and depicting a car being transported;

FIG. 2 is a fragmentary perspective view with parts thereof broken away illustrating a front portion of a rail of the deck platform locked-down in one of the hold-down devices on the bed of the vehicle;

FIG. 3 is a perspective view illustrating the tilt function apparatus of the present invention;

FIG. 4 is a top plan view of the control system for the car carrier vehicle illustrating the means for sliding and tilting the deck platform;

FIG. 5 is a cross sectional view of a portion of the apparatus illustrated in FIG. 2 further depicting the hold-down device with the rail in the locked position;

FIG. 6 is a fragmentary elevational view illustrating the disabling of the tilt cylinders when the deck platform is locked in the hold-down position; and FIG. 7 is a view similar to FIG. 6 but illustrating the normal control for actuation of the tilt cylinders when the deck platform is disposed so it will not damage the hold-down device.

DESCRIPTION OF THE PREFERRED EMBODIMENT

Referring to the drawings, a car carrier vehicle is illustrated at 10, the vehicle preferably operating to recover and transport at least one disabled car 12 on a platform 14 relatively slidable and tiltable on the bed 16 of the vehicle at the rear of the cab 18. The vehicle preferably has tow bar means (not illustrated) mounted at the rear thereof beneath the bed which may be used to tow a second disabled vehicle. Control cranks 20, 22, 24, 26 are connected to respective control rods 28, 30, 32, 34 which in turn are rotatably journalled in and carried by brackets 36, 37 secured to the bed at respective sides thereof.

The deck platform 14 comprises a substantially planar floor member 38 formed from a series of panels 40, only a portion of which is illustrated, but which is fully disclosed in copending application Ser. No. 020,096, filed Feb. 27, 1987 owned by the common assignee of the present invention, the panels being fastened to at least a pair of moveable rails 42, 44. The rails 42, 44 are each substantially I-shaped beams but each beam has one of the top flanges 46 exended and at the end thereof a downwardly depending leg 48 is formed, the leg having a toe 50 projecting slightly toward the web 52 of the rail. The web also has a protuberance 54 spaced below the top flange so that the upper surface of the protuberance and the space between the toe 50 and top flange receive a bearing strip 55 which is retained in a pocket in the lower surface of the flange 46. The bearing strip 55 rests on and slides to a respective box beam 56, 57 which forms guideways on which the rails 42, 44 may slide, but which are tiltable with the rails.

At the front of the bed 16 just behind the cab 18 is a laterally extending structural member which may be a channel beam 58 which, at each end, carries a small upstanding member such as a channel beam 60 (only one of which is illustrated). Secured to the outer or lateral side of each beam 60 is a 90° angle bracket 62 having a hard resilient block 64, such as nylon or the like, fastened to the underside of the lower leg. Spaced from the lower surface of the block 64 by an amount equal to the thickness of the lower flanges 66 of the rails 42, 44 plus a small clearance space is the top surface 68 of a guide bracket 70 which is secured at the bottom to a fixed member such as a beam 72 forming a portion of the frame of the bed 16. The block 64 and angle bracket 62 form tha hold-down devices which prevent the rails and thus the platform deck from inadvertently tilting when the platform deck is forwardly disposed and the flange 66 of the respective rail is sandwiched between the bottom of the block 64 and the top surface 68 of the bracket 70. Each bracket 70 may have an angular ramp 74 for guiding the respective flange 66 onto the surface 68 and into the hold-down space below the block 64 as the platform deck is slid forwardly.

In order to slide and tilt the deck platform 14 there is provided a hydraulic control valve 76, the valve 76 preferably being a conventional multi-port valve capable, in the preferred embodiment, of controlling four separate hydraulic devices. For example, the platform lift and extension functions are controlled by separate portions of the valve as may be the operation of a winch (not illustrated) for pulling a disabled car onto the deck platform, and the operation of a tow bar cylinder (not illustrated) for use when towing a second disabled vehicle behind the carrier vehicle 10. Of course, separate valves may be used for each function if desired without departing from the present invention. Control of a winch is through the crank 20, through the rod 28 to which linkage 78 is operatively connected, and control of a tow bar cylinder can be by the crank 26 through the rod 34 to which linkage 80 is operatively connected, both in a manner similar to the deck platform sliding extension as hereinafter described.

The deck platform 14 includes a beam or block 82 secured to and moveable with the floor member 38 and the rails 42, 44. Secured to the block 82 is the moveable piston 84 of a hydraulic cylinder 86, the head end of which is connected by hydraulic lines 88 to the valve 76. The rod 32 which is connected to the crank 24 is further connected to linkage including a clevis pin 90 and a yoke 92 connected to one end of a control rod 94, the other end of the rod being connected by a clevis pin to a yoke 96 which in turn is connected to the portion of the valve 76 which controls flow of hydraulic fluid to the lines 88 and thus the cylinder 86. Turning of the crank 24 thereby controls operation of the piston 84 and hence the longitudinal extension of the deck platform toward and away from the cab 18.

In a similar manner the crank 22 controls a pair of hydraulic lift cylinders 98 each having a piston 100 extending at the front thereof and pivotally connected by pin means 102 to a portion of the bed 16. The head end of each piston is pivotably connected to a beam 104 which in turn is secured to the box beams 56, 57 on which the rails 42, 44 respectively slide. The rod 30 to which the crank 22 is connected is further connected through a clevis pin 106 and a yoke 108 which in turn is connected to one end of a control rod 110. The rod 110 is additionally connected at its other end to a yoke 112 which in turn is connected to the portion of the valve 76 which controls flow of hydraulic fluid to lines 113, 114 which communicate with the cylinders 98. Thus, actuation of the cylinders 98 by turning the crank 22 effects tilting of the beam 104 and thereby the deck platform 14.

In the normal course of operation, when a disabled vehicle is to be drawn onto the floor member 38 of the deck platform by, for example, a winch or the like the operator first slides the deck platform rearwardly by turning the crank 24 to release the rails 42 and 44 from the hold-down devices 62, 64 until it is disposed for tilting, and thereafter turns the crank 22 to tilt the deck platform. The operator thereafter normally turns both cranks 22, 24 until the rear of the deck platform is disposed on the ground for receiving the disabled vehicle. Once the disabled vehicle is pulled onto the floor member 38 the process is reversed and the deck is thereafter partly slid forwardly and tilted back, then slid forwardly until the deck platform is again locked by the hold-down device.

This normal safe operating procedure, however, is sometimes disregarded as when an operator is acting rapidly under stressful conditions or in inclement weather. There have been occasions when the crank 22 is initially turned rather than the crank 24 at the time the deck panel is in the locked position and is to be moved into the car receiving position. The result is that the rails 42, 44 begin to lift before they are released from the hold-down devices and the load applied to the members 62, 64 may result in damage to or breaking of this safety device. Additionally, after the car has been pulled onto the floor of the deck platform occasionally, since the operator is turning both the cranks 22 and 24 intermittently (or when rushing sometimes even simultaneously), the deck platform may not be fully tilted downwardly when it has been slid to its forward most position. This results in the rails 42, 44 engaging the respective bracket 62 and also may result in breaking of the hold-down safety devices, or at the least the deck platform is not locked. In either case the deck platform 14 is no longer in a safe locked-down condition and great hazards can result.

Accordingly, the present invention ensures that the proper sequence occurs so that the rails 42, 44 are released from the hold-down device before the deck platform can be tilted toward the car receiving position and so that the deck platform will not return to its rest position if it is slidably disposed in its forward position.

To this end, an upstanding ear 115 is fastened onto the rod 30 and has a cam member 116 welded or otherwise secured to the elongated upstanding end thereof. Fixedly disposed on the flange 66 as by welding or the like is a stop plate 118. The width of the stop plate and its position on the flange 66 is such that it extends outwardly therefrom and the longitudinal disposition of the stop plate and the cam member 116 are such that the cam member can abut and be engaged by the stop plate when the stop plate is disposed above the cam member while the crank 22 is in the neutral or inactive position. As illustrated in FIG. 6, when the cam member and the stop plate are engaged the crank 22 cannot be turned and thus the deck platform cannot be tilted.

The longitudinal disposition of the stop plate 118 and the effective length of the stop plate and the cam 116 are such that they will be disposed in abutting relationship to each other to prevent turning of the crank 22 when the rails 42 and 44 are within the space between the block 64 and the top 68 of the bracket 70 and a short distance therefrom so that the deck platform cannot be tilted until the rails 42 and 44 are clear of the hold-down devices when the deck platform is to be moved to the car receiving position. Moreover, the cam member 116 will engage the stop plate 118 if the rails have moved above the hold-down device when the deck platform first has been slidably disposed at its most forward position, but has not been fully tilted to the horizontal disposition when the deck platform 14 is moving to the storage position. In this latter instance the stop plate 118 will be at an inclined angle but the cam member 116 will engage it quickly when the operator tries to turn the crank 22.

In a carrier vehicle having a prototype of the invention, the effective length of the cam member was approximately 5½ inches and the effective length of the stop plate was approximately 12½ inches which provides more than sufficient overlap to preclude tilting of the deck platform while ensuring that both parts are not overloaded when engaged. Each of the cam member 116 and stop plate 118 may have a respective angular ramp 120, 122, the ramp 120 being on the rear end of the cam member while the ramp 122 is on the forward end of the stop plate for providing a smooth transition when the deck platform is slid forwardly from a rear position. Ramps are not necessary in the preferred embodiment at the other ends of these elements since, as illustrated in FIG. 6, the entire cam member 116 is in contact with a central portion of the stop plate 118 while the rails 42 and 44 are within the hold-down device. FIG. 7 illustrates a position of the rails where the cam member 116 cannot contact the stop plate 118 and the crank 22 can be turned so as to tilt the deck platform.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A carrier vehicle having a fixed bed, a deck platform supported on said bed and adapted for carrying at least one car or the like thereon, said platform being mounted for sliding relatively to said bed in a longitudinal direction between a rest position at the forward end of said bed and a rearward active position, and for tilting relatively to said bed about a horizontal axis substantially normal to said longitudinal direction, first hydraulic means for selectively driving said platform in the longitudinal direction and second hydraulic means for selectively tilting the platform about said axis, said vehicle having platform hold-down means for locking said platform against inadvertent tilting of said platform when in the rest position, and disabling means for cooperating with the platform when the platform is locked by the hold-down means and for precluding operation of said second hydraulic means while said platform is locked by said hold-down means and until said first hydraulic means is actuated to drive said platform from the rest position rearwardly of said hold-down means.

2. A carrier vehicle as recited in claim 1, wherein said second hydraulic means includes hydraulic cylinder means connected to said platform and to said bed for pivotally tilting said platform relatively to said bed, a valve for controlling flow of hydraulic fluid to said cylinder means, a control rod journalled in said bed for selective turning, and linkage operatively connecting said control rod to said valve for controlling the hydraulic cylinder means, said disabling means including cam means for precluding turning of said rod when said platform is locked by said hold-down means and until said first hydraulic means is actuated to drive said platform from the rest position rearwardly of said hold-down means.

3. A carrier vehicle as recited in claim 2, wherein said platform includes floor means secured to at least one elongated rail member, said cam means including stop means having a finite length in said longitudinal direction secured to said rail member, and a cam fixed to said control rod and disposed for engaging said stop means when said platform is locked by said hold-down means and until said first hydraulic means is actuated to drive said platform from the rest position rearwardly of said hold-down means.

4. A carrier vehicle as recited in claim 3, wherein said stop means comprises a plate member having a substantially planar bottom surface, and said cam comprises a plate having a substantially planar top surface, said top surface and said bottom surface being substantially in abutting engagement when said platform is locked by said hold-down means.

5. A carrier vehicle as recited in claim 4, wherein said bottom surface of said plate member is inclined upwardly at the forward facing end thereof to form a first ramp, and said top surface of said cam plate is inclined downwardly at the rearwardly facing end thereof to form a second ramp, said first and second ramps providing a smooth transition when said deck is longitudinally slid forwardly from a rear position.

6. A carrier vehicle as recited in claim 2, wherein said platform includes floor means secured to at least one elongated rail member, said rail member having a laterally extending flange thereon of a finite thickness, said hold-down means including a pair of spaced apart guide members fixed to said bed at the front thereof and defining a space therebetween for receiving a portion of said flange when said platform is in the rest position to lock the rail and thus the platform from tilting.

7. A carrier vehicle as recited in claim 6, wherein said cam means includes stop means having a finite length in said longitudinal direction secured to said rail member, and a cam fixed to said control rod and disposed to engage said stop means when said flange is disposed in said space but for being free of said stop means when said flange is moved rearwardly of said guide members.

8. A carrier vehicle as recited in claim 7, wherein said stop means comprises a plate member having a substantially planar bottom surface, and said cam comprises a plate having a substantially planar top surface, said top surface and said bottom surface being substantially in abutting engagement when said flange is disposed in said space.

9. A carrier vehicle as recited in claim 8, wherein said top surface and said bottom surface are disposed for engagement for precluding turning of said control rod when said platform is moved from a rearward active position and said flange is not disposed for receipt within said space.

10. A carrier vehicle as recited in claim 9, wherein said bottom surface of said plate member is inclined upwardly at the forward facing end thereof to form a first ramp, and the top surface of said cam plate is inclined downwardly at the rearwardly facing end thereof to form a second ramp, said first and second ramps providing a smooth transition when said deck is longitudinally slid forwardly from a rear position.

11. A carrier vehicle as recited in claim 7, wherein said rail member includes a pair of spaced apart flanges extending laterally therefrom in a direction opposite to the first mentioned flange, said spaced apart flanges including means for receiving longitudinally fixed guide beam means along which said rail may slide, and means for connecting said beam means to said hydraulic cylinder means for pivotable tilting of said beam means relative to said bed upon turning of said control rod.

12. A carrier vehicle as recited in claim 11, wherein said stop means comprises a plate member having a substantially planar bottom surface, and said cam comprises a plate having a substantially planar top surface, said top surface and said bottom surface being substantially in abutting engagement when said flange is disposed in said space.

13. A carrier vehicle as recited in claim 12, wherein said top surface and said bottom surface are disposed for engagement for precluding turning of said control rod when said platform is moved from a rearward active position and said flange is not disposed for receipt within said space.

14. A carrier vehicle as recited in claim 13, wherein said bottom surface of said plate member is inclined upwardly at the forward facing end thereof to form a first ramp, and said top surface of the cam plate is inclined downwardly at the rearwardly facing end thereof to form a second ramp, said first and second ramps providing a smooth transition when said deck is longitudinally slid forwardly from a rear position.

15. A carrier vehicle having a fixed bed, a deck platform supported on said bed and adapted for carrying at least one car or the like thereon, said platform comprising a floor secured to at least a pair of elongated rail members, said rail members being mounted for sliding relatively to said bed in a longitudinal direction between a rest position at the forward end of said bed and a rearward active position, beam means for guiding said rails for longitudinal movement relative thereto, first hydraulic cylinder means for selectively driving said platform and said rails in the longitudinal direction relative to said beam means, second hydraulic cylinder means for selectively tilting the beam means together with said rails and said platform about a horizontal axis substantially normal to said longitudinal direction, a valve for controlling flow of hydraulic fluid to said second hydraulic cylinder means, a control rod journalled in said bed for selective turning, linkage operatively connecting said control rod to said valve for controlling the second hydraulic cylinder means, said bed having platform hold-down means for locking said rails and thus said platform against inadvertent tilting of said platform when in the rest position, and cam means for precluding turning of said control rod when said rails are locked by said hold-down means to preclude tilting of said platform by said second hydraulic cylinder means until said first hydraulic cylinder means is actuated to drive said platform from the rest position rearwardly to release said rails from said hold-down means.

16. A carrier vehicle as recited in claim 15, wherein said cam means comprises a stopping plate secured to at least one of said rail members and having a finite length in the longitudinal direction, and a cam plate fixed to said control rod and disposed for engaging said stop plate when said rails are locked by said hold-down means and until said first hydraulic cylinder means is actuated to drive said platform from the rest position rearwardly to release said rails from said hold-down means.

17. A carrier vehicle as recited in claim 16, wherein said rails have laterally extending flanges thereon of a finite thickness, said hold-down means including a pair of spaced apart guide members fixed to said bed at the front thereof and defining a space therebetween for receiving a portion of the flange of the respective rails when the platform is in the rest position.

18. A carrier vehicle as recited in claim 17, wherein said stopping plate comprises a substantially planar bottom surface, and said cam plate comprises a substantially planar top surface, said top surface and said bottom surface being substantially in abutting engagement when the flanges of said rails are disposed within the respective space.

* * * * *